(12) United States Patent
Tsuchimoto et al.

(10) Patent No.: US 10,261,483 B2
(45) Date of Patent: Apr. 16, 2019

(54) DIGITALLY CONTROLLED POWER SOURCE HAVING DC-DC CONVERTERS IN SUBSEQUENT STAGE

(71) Applicant: FANUC Corporation, Yamanashi (JP)

(72) Inventors: Masataka Tsuchimoto, Yamanashi (JP); Shouhei Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 329 days.

(21) Appl. No.: 15/208,609

(22) Filed: Jul. 13, 2016

(65) Prior Publication Data

US 2017/0019020 A1    Jan. 19, 2017

(30) Foreign Application Priority Data

Jul. 15, 2015  (JP) .................................. 2015-141566

(51) Int. Cl.
| | |
|---|---|
| G05B 15/02 | (2006.01) |
| H02M 1/32 | (2007.01) |
| H02M 1/36 | (2007.01) |
| H02M 3/157 | (2006.01) |
| H02M 3/335 | (2006.01) |
| H02M 1/00 | (2006.01) |

(52) U.S. Cl.
CPC .............. *G05B 15/02* (2013.01); *H02M 1/32* (2013.01); *H02M 1/36* (2013.01); *H02M 3/157* (2013.01); *H02M 3/33515* (2013.01); *H02M 2001/008* (2013.01)

(58) Field of Classification Search
CPC ............ G05B 15/02; H02M 1/36; H02M 1/32

USPC ......................................................... 700/298
See application file for complete search history.

(56) References Cited

U.S. PATENT DOCUMENTS

| 8,222,772 | B1 | 7/2012 | Vinciarelli |
|---|---|---|---|
| 2002/0131788 | A1 | 9/2002 | Nakaya |
| 2004/0189273 | A1 | 9/2004 | Imai et al. |
| 2008/0252277 | A1 | 10/2008 | Sase et al. |

(Continued)

FOREIGN PATENT DOCUMENTS

| CN | 102308462 A | 1/2012 |
|---|---|---|
| CN | 102882388 A | 1/2013 |

(Continued)

OTHER PUBLICATIONS

Decision to Grant a Patent in JP Patent Application No. 2015-141566, dated Sep. 19, 2017, 6 pp.

(Continued)

*Primary Examiner* — Anthony Ho
(74) *Attorney, Agent, or Firm* — Hauptman Ham, LLP

(57) ABSTRACT

In a digitally controlled power source, a setting value of an output voltage therefrom is set in advance in the vicinity of an upper limit within a tolerable range of fluctuation. Even if a voltage drop is caused by starting currents that flow upon initial rise of DC-DC converters in a subsequent stage, such setting makes it possible to confine values of the output voltage within the tolerable range of fluctuation because the setting value of the output voltage is set in advance at a relatively high value. Accordingly, the starting currents in the DC-DC converters can be increased without restriction so that rise time for the power source can be shortened.

1 Claim, 4 Drawing Sheets

(56) References Cited

U.S. PATENT DOCUMENTS

| | | |
|---|---|---|
| 2012/0236612 A1 | 9/2012 | Uno |
| 2012/0262141 A1 | 10/2012 | Heineman et al. |
| 2012/0306506 A1* | 12/2012 | Kiuchi ............... G01R 31/3658 |
| | | 324/434 |
| 2013/0016531 A1 | 1/2013 | Aso |

FOREIGN PATENT DOCUMENTS

| | | |
|---|---|---|
| JP | 10-290524 A | 10/1998 |
| JP | 2002-49430 A | 2/2002 |
| JP | 2002-359970 A | 12/2002 |
| JP | 2004-297983 A | 10/2004 |
| JP | 2005-198454 A | 7/2005 |
| JP | 2008-99439 A | 4/2008 |

OTHER PUBLICATIONS

Office Action in DE Application No. 102016112648.9, dated Oct. 1, 2018, 10pp.
Office Action in CN Application No. 201610555156.5, dated Jul. 3, 2018, 13pp.

* cited by examiner

DIGITALLY CONTROLLED POWER SOURCE HAVING DC-DC CONVERTERS IN SUBSEQUENT STAGE

RELATED APPLICATIONS

The present application claims priority to Japanese Patent Application Number 2015-141566 filed Jul. 15, 2015, the disclosure of which is hereby incorporated by reference herein in its entirety.

BACKGROUND OF THE INVENTION

1. Field of the Invention

The present invention relates to a digitally controlled power source with an output terminal to which DC-DC converters are connected.

2. Description of the Related Art

In a power circuit having DC-DC converters for one or more channels in a subsequent stage, an instantaneous voltage drop may be caused by starting currents in the DC-DC converters in the subsequent stage. As techniques for reducing such an instantaneous voltage drop, power circuits that suppress start-up of a DC-DC circuit with use of capacitors, zener diodes, and/or the like until an input voltage is made constant and that thereby confine an output voltage value within a specified range are disclosed in Japanese Patent Applications Laid-Open Nos. 2002-049430 and 2005-198454, for instance. A power circuit in which influence of the starting currents and the instantaneous voltage drop are reduced by insertion of a starting current suppressing circuit made of thermistors or the like between a controlled power source and a DC-DC converter is disclosed in Japanese Patent Application Laid-Open No. 10-290524.

FIG. 3 is a schematic configuration diagram of a power circuit for a digitally controlled power source according to a prior art technique.

In the power circuit, an arithmetic processing unit 4 carries out digital computation based on a value of an output voltage $V_{out1}$ fed back through an A/D converter 5 and outputs command values based on a result of the computation to a PWM generator unit 3. The PWM generator unit 3 generates and outputs PWM signals based on the command values from the arithmetic processing unit 4 and a switching power circuit 2 outputs a voltage $V_{out1}$ based on the outputted PWM signals. The voltage $V_{out1}$ outputted from the switching power circuit 2 makes a starting current $I_{out1}$ flow through a DC-DC converter 12a and a voltage $V_{out2}$ is then outputted. A starting current suppressing circuit 11 is provided in order to restrict an amount of the current flowing instantaneously.

A graph of FIG. 4A illustrates change in the current and the voltages at start-up in the power circuit which is illustrated in FIG. 3 and in which the starting current suppressing circuit 11 made of thermistors or the like is not incorporated and a graph of FIG. 4B illustrates change in the current and the voltages at start-up in the power circuit which is illustrated in FIG. 3 and in which the starting current suppressing circuit 11 is incorporated.

In the power circuit in which the starting current suppressing circuit 11 is not incorporated, as illustrated in FIG. 4A, an instantaneous voltage drop in the output voltage $V_{out1}$ of the digitally controlled power source 1 may be caused by an inrush current in the starting current $I_{out1}$ at the DC-DC converter 12a in the subsequent stage.

In the power circuit in which the starting current suppressing circuit 11 is incorporated, by contrast, as illustrated in FIG. 4B, the voltage drop in the output voltage $V_{out1}$ of the digitally controlled power source 1 can be suppressed by imposition of restriction on the starting current $I_{out1}$.

The imposition of the restriction on the starting current with provision of the starting current suppressing circuit, however, causes a problem in that prolongation of rise time for the power source may result in unsatisfaction of a request sequence at the start-up. A method in which voltage fluctuation at the start-up is suppressed by capacitors causes a problem in that necessity of the capacitors having large capacitance inhibits size reduction of the power source.

SUMMARY OF THE INVENTION

An object of the present invention is to provide a digitally controlled power source by which rise time can be shortened without increase in capacitance of output capacitors of a power circuit.

A digitally controlled power source according to the present invention includes A/D converters that convert voltages into numerical values, an arithmetic processing unit that carries out digital computation for the numerical values converted by the A/D converters, a PWM generator unit that generates PWM signals based on command values from the arithmetic processing unit, and a switching power circuit that outputs a voltage value based on the PWM signals outputted from the PWM generator unit and has an output terminal to which DC-DC converters are connected. The digitally controlled power source further includes a voltage monitor unit that monitors output voltages from the DC-DC converters with use of the arithmetic processing unit and a changing unit that sets a setting value of an output voltage of the digitally controlled power source at a rough upper limit within a tolerable range of the output voltage in advance and that changes the command values from the arithmetic processing unit so as to change the setting value of the output voltage to a specified value of the output voltage when the voltage monitor unit detects that the values of the output voltages from the DC-DC converters exceed preset thresholds.

According to the present invention, values of the output voltage of the digitally controlled power source can be confined within the tolerable range of fluctuation because the setting value of the output voltage has been set in the vicinity of the upper limit within the tolerable range of fluctuation even if a large voltage drop is caused by starting currents in the DC-DC converters in a subsequent stage. As a result, necessity of output capacitors having large capacitances is removed so that the capacitances of the output capacitors of a power circuit can be decreased. In addition, rise time can be shortened because the starting currents in the DC-DC converters in the subsequent stage can be increased without necessity of restriction thereon.

BRIEF DESCRIPTION OF THE DRAWINGS

The above-mentioned and other objects and features of the present invention will become apparent from the following description of the embodiment with reference to the accompanying drawings, in which.

DETAILED DESCRIPTION OF THE PREFERRED EMBODIMENTS

Figure 3:
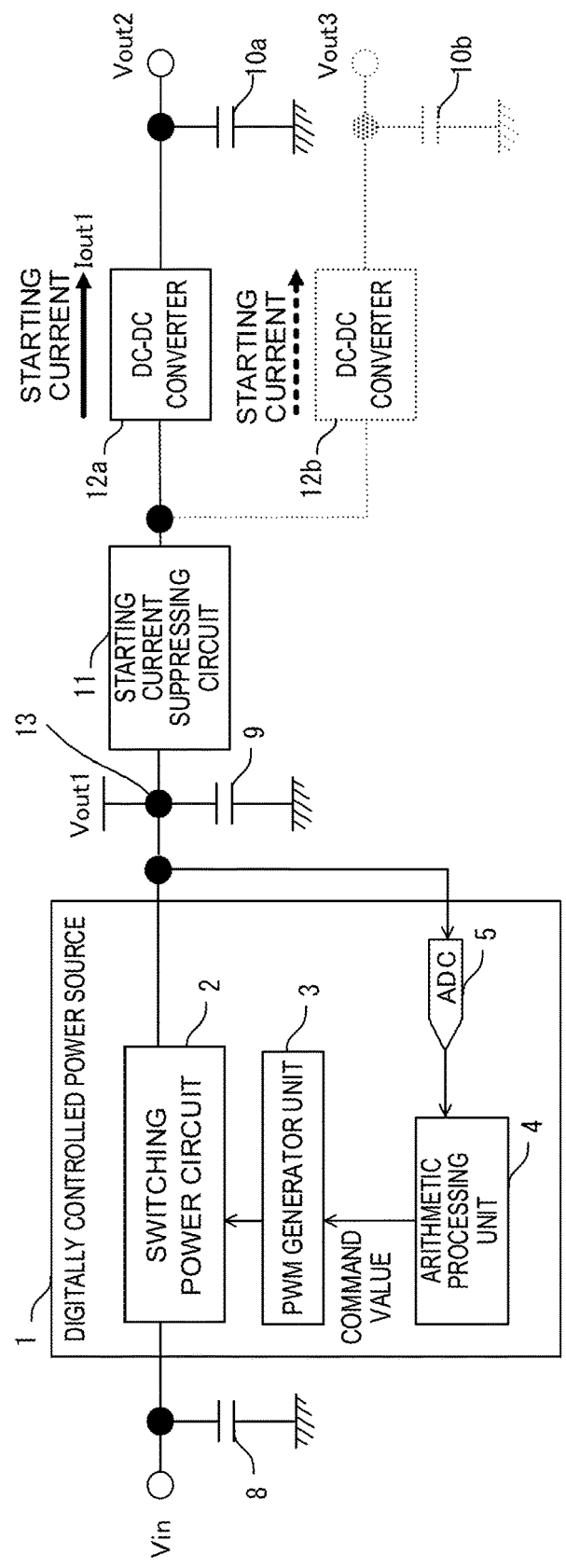
FIG. 3 is a schematic configuration diagram of a power circuit according to a prior art technique.
Figure 4A:
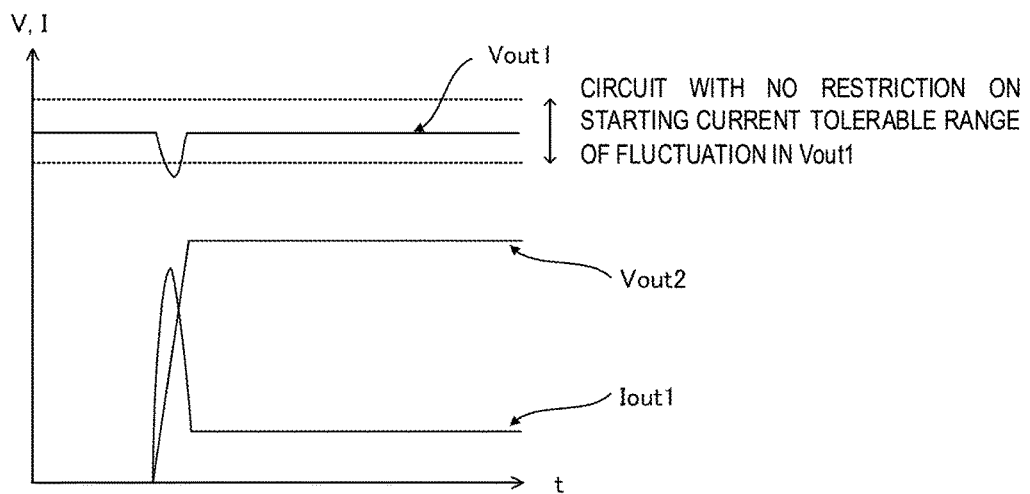
FIG. 4A is a diagram illustrating change in a current and voltages at start-up in the power circuit which is illustrated in FIG. 3 and in which any starting current suppressing circuit is not incorporated.
Figure 4B:
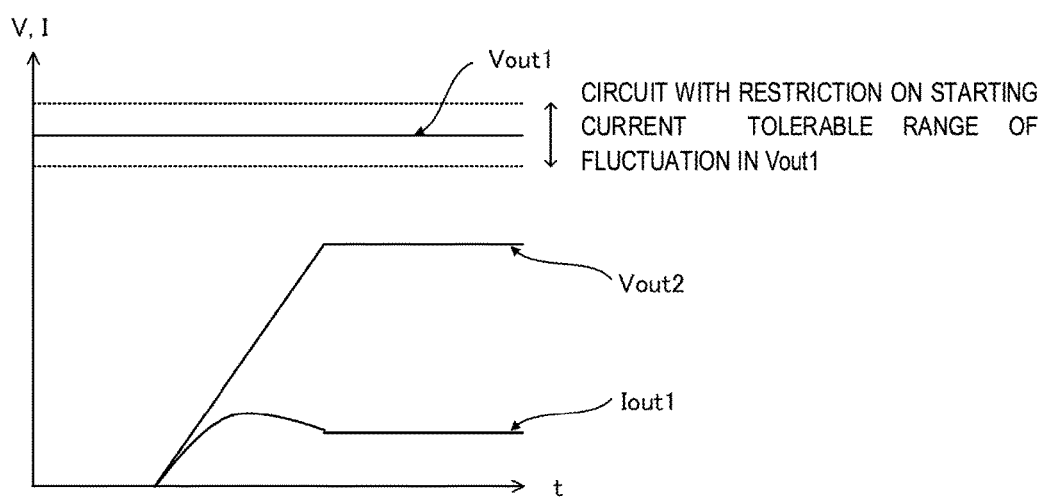
FIG. 4B is a diagram illustrating change in a current and voltages at start-up in the power circuit which is illustrated in FIG. 3 and in which a starting current suppressing circuit is incorporated.

Hereinbelow, an embodiment of the present invention will be described with reference to FIGS. 1 and 2. Configurations that are the same as or similar to those of the prior art technique described with reference to FIGS. 3 through 4B will be described with use of the same reference characters therefor.

In a digitally controlled power source of the invention, a setting value of an output voltage of the digitally controlled power source is set in advance in the vicinity of an upper limit within a tolerable range of fluctuation. Even if a voltage drop is caused by starting currents that flows upon initial rise of DC-DC converters in a subsequent stage, such setting makes it possible to confine the value of the output voltage within the tolerable range of fluctuation because the setting value of the output voltage has been set in advance at a relatively high value. Accordingly, the starting currents in the DC-DC converters can be increased without restriction and the rise time for the power source can be shortened.

Figure 1:
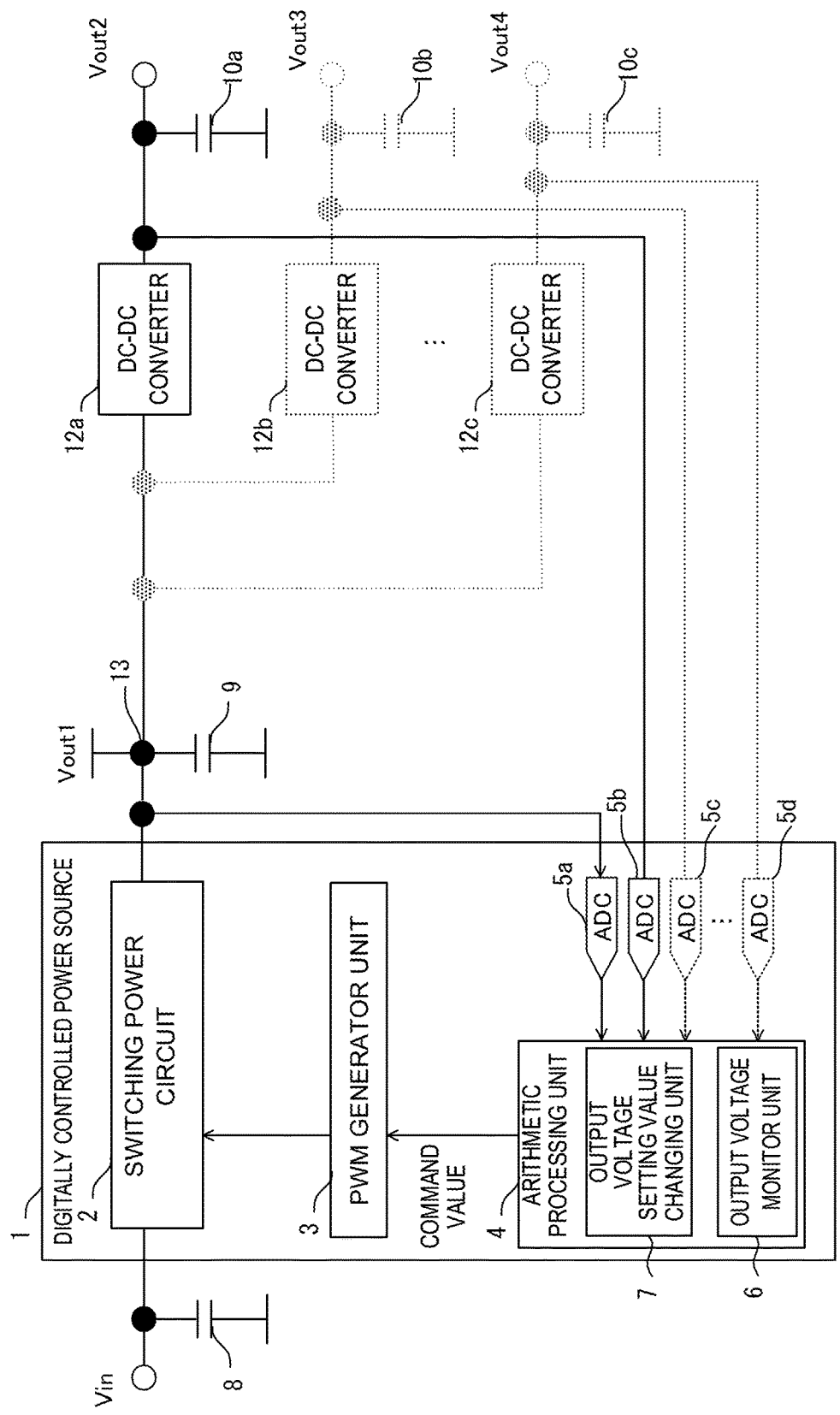
FIG. 1 is a diagram illustrating a schematic configuration of a power circuit that includes a digitally controlled power source according to an embodiment of the invention.

FIG. 1 is a diagram illustrating a schematic configuration of a power circuit that includes a digitally controlled power source according to the embodiment of the invention.

In the power circuit, an input voltage $V_{in}$ is inputted into the digitally controlled power source 1 via a capacitor 8 and is then converted by the switching power circuit 2 so that an output voltage $V_{out1}$ is outputted to output terminal 13. DC-DC converters 12a, 12b, 12c, . . . that are the same in number as channels are connected to the digitally controlled power source 1 in a stage subsequent thereto. The voltage $V_{out1}$ from the digitally controlled power source 1 that is inputted via a capacitor 9 is converted by the DC-DC converters 12a, 12b, 12c, . . . into voltages $V_{out2}$, $V_{out3}$, $V_{out4}$, . . . , which are outputted via capacitors 10a, 10b, 10c, . . . , respectively.

The setting value of the output voltage is set for the digitally controlled power source 1 and the arithmetic processing unit 4 computes command values, based on the value of the output voltage $V_{out1}$ fed back through the A/D converter 5a, so that the setting value of the output voltage equals the output voltage $V_{out1}$, and the arithmetic processing unit 4 outputs the command values to the PWM generator unit 3. The PWM generator unit 3 generates and outputs PWM signals based on the command values received from the arithmetic processing unit 4 and the voltage $V_{out1}$ is outputted from the switching power circuit 2 based on the outputted PWM signals.

The arithmetic processing unit 4 includes an output voltage monitor unit 6 and an output voltage setting value changing unit 7. The output voltage monitor unit 6 monitors values of the output voltage $V_{out2}$, $V_{out3}$, $V_{out4}$, . . . from the DC-DC converters 12a, 12b, 12c, . . . that are fed back through A/D converters 5b, 5c, 5d, . . . and the output voltage setting value changing unit 7 changes the setting value of the output voltage of the digitally controlled power source 1 based on the monitored values of the output voltages from the DC-DC converters 12a, 12b, 12c, . . . . The output voltage setting value changing unit 7 changes the setting value of the output voltage to a rough upper limit of the output voltage $V_{out1}$ within a tolerable range of fluctuation thereof that has been preset for the digitally controlled power source 1 at start-up of the power circuit and changes the setting value of the output voltage to a specified normal value of the output voltage at a point of time when the output voltages $V_{out2}$, $V_{out3}$, $V_{out4}$, . . . fed back from the DC-DC converters 12a, 12b, 12c, . . . exceed respective preset thresholds for the output voltages.

Figure 2:
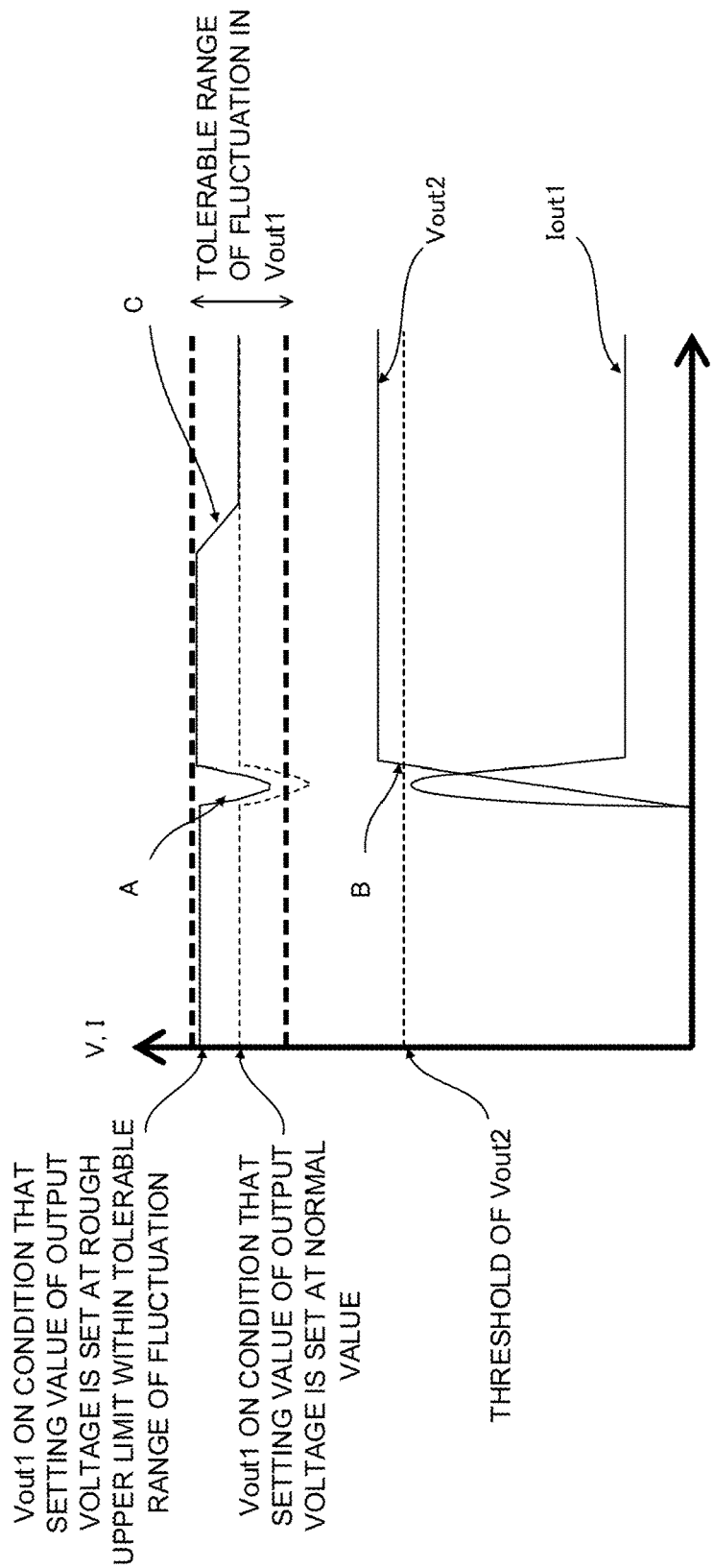
FIG. 2 is a diagram in which an output voltage from the power circuit of FIG. 1, an output voltage from DC-DC converters, and a starting current are illustrated in a graph.

FIG. 2 is a diagram in which the output voltage $V_{out1}$ from the power circuit of FIG. 1, the output voltage $V_{out2}$ from the DC-DC converter 12a, and the starting current $I_{out1}$ are illustrated in a graph.

In the power circuit of the invention, as illustrated in FIG. 2, the setting value of the output voltage from the digitally controlled power source 1 is set at the rough upper limit of the output voltage $V_{out1}$ within the tolerable range of fluctuation thereof at the start-up of the power source. Therefore, the value of the output voltage $V_{out1}$ can be confined within the tolerable range of fluctuation even if a voltage drop in the output voltage $V_{out1}$ is caused by generation of an inrush current in the starting current $I_{out1}$ that flows through the DC-DC converter 12a (see an arrow A in FIG. 2).

When the value of the output voltage $V_{out2}$ from the DC-DC converter 12a thereafter exceeds the preset threshold (see an arrow B in FIG. 2), it is determined that the start-up of the power circuit has been completed and the setting value of the output voltage from the digitally controlled power source 1 is changed to the specified normal value of the output voltage (see an arrow C in FIG. 2). In a configuration in which a plurality of DC-DC converters are provided, it is preferably determined that the start-up of the power circuit has been completed when the values of the output voltages from all the DC-DC converters exceed the respective thresholds.

In the configuration of the digitally controlled power source according to the embodiment, capacitances of the output capacitors of the power circuit can be decreased even if a large voltage drop is caused by the starting currents in the DC-DC converters in the subsequent stage because the setting value of the voltage has been set in advance in the vicinity of the upper limit within the tolerable range of fluctuation. In addition, the rise time can be shortened because the starting currents in the DC-DC converters in the subsequent stage can be increased.

Though the embodiment of the present invention has been described above, the invention is not limited to an example of the embodiment described above and can be embodied in various manners with appropriate modification.

The invention claimed is:

1. A digitally controlled power source, comprising:
   A/D converters that convert voltages into numerical values;
   an arithmetic processing unit that carries out digital computation for the numerical values converted by the A/D converters;
   a PWM generator unit that generates PWM signals based on command values from the arithmetic processing unit; and a switching power circuit that outputs a voltage value based on the PWM signals outputted from the PWM generator unit, the digitally controlled power source having an output terminal to which DC-DC converters are connected, wherein the digitally controlled power source further includes
- a voltage monitor unit that monitors output voltages from the DC-DC converters with use of the arithmetic processing unit, and
- a changing unit that sets a setting value of an output voltage of the digitally controlled power source at an upper limit within a predetermined range of the output voltage in advance and that changes the command values from the arithmetic processing unit so as to change the setting value of the output voltage to a specified value of the output voltage when the voltage monitor unit detects that the values of the output voltages from the DC-DC converters exceed preset thresholds.

\* \* \* \* \*